United States Patent [19]

Kazama

[11] Patent Number: 5,014,812
[45] Date of Patent: May 14, 1991

[54] DRIVE SYSTEM FOR VEHICLE
[75] Inventor: Akio Kazama, Saitama, Japan
[73] Assignee: Honda Giken Kogyo Kabushiki Kaisha, Tokyo, Japan
[21] Appl. No.: 371,216
[22] Filed: Jun. 26, 1989
[30] Foreign Application Priority Data Jun. 24, 1988 [JP] Japan .................. 63-157086

[51] Int. Cl.$^5$ .................. B60K 1/00
[52] U.S. Cl. .................. 180/292; 123/195 C; 123/195 AC
[58] Field of Search .............. 180/291, 297, 312, 292; 123/195 AC, 198 E, 195 C; 74/695, 700, 713

[56] References Cited

U.S. PATENT DOCUMENTS

| 3,494,225 | 2/1970 | Binder et al. | 74/700 |
| 4,135,478 | 1/1979 | Rassey | 123/195 AC |
| 4,520,770 | 6/1985 | Ogawa | 123/198 E |
| 4,524,735 | 6/1985 | Bauder | 123/198 E |

FOREIGN PATENT DOCUMENTS

| 1555101 | 7/1970 | Fed. Rep. of Germany . |
| 3323626 | 1/1985 | Fed. Rep. of Germany ...... 180/291 |
| 4813015 | 4/1973 | Japan . |

| 1032090 | 6/1966 | United Kingdom . |

Primary Examiner—Andres Kashnikow
Assistant Examiner—Eric Culbreth
Attorney, Agent, or Firm—Lyon & Lyon

[57] ABSTRACT

A drive system for a vehicle (V) provided with a power plant (P) which includes an engine (1), a transmission (3) and a differential device (D). The engine is located longitudinally of the vehicle with the crankshaft extending front-to-rear of the vehicle. The power plant drives left and right drive wheels disposed on opposite sides of the engine. The engine has a cylinder axis ($L_1$—$L_1$) inclined to the left or right of the vehicle and includes a cylinder block (6) and an oil pan (13) between which is interposed a lower case (9). The cylinder block and the lower case are joined together at joining surfaces thereof on a plane which extends through the center (O) of the journal bearings (10) for the crankshaft as well as perpendicular to the cylinder axis. The differential case (17) is connected to the lower side face of the engine on the side of inclination of the engine. An intermediate transmission shaft (12) extends through and is supported by the lower case for connecting the differential device and the drive wheel located on the opposite side of the engine.

8 Claims, 7 Drawing Sheets

DRIVE SYSTEM FOR VEHICLE

This invention relates to a drive system for a vehicle wherein the engine is oriented longitudinally of the vehicle (i.e., with its crankshaft being disposed parallel to the longitudinal direction of the vehicle) and is adapted to drive left and right drive wheels which are located directly on opposite lateral sides of the engine.

The present invention is applicable to either an arrangement where the engine is disposed at the front part of the vehicle and drives left and right front wheels or an arrangement where the engine is disposed at the rear part of the vehicle to drive left and right rear wheels.

It is conventionally known for a power plant to be comprised of an engine, a transmission and a differential device in a single unit disposed in the longitudinal direction of the vehicle with the output of the power plant transmitted to lateral drive wheels via an intermediate transmission shaft which penetrates through and is carried by the power plant such as in Japanese Patent Publication Kokoku No. 48-13015, U.S. Pat. No. 3,494,225, British Patent 1,032,090, German Patent 1,555,101, and U.S. patent application Ser. No. 282,476, filed Dec. 9, 1988 assigned to the assignee of this application.

In one of such conventional structure, i.e., Japanese Publication No. 48-13015, however, the cylinder block and oil pan of the engine and the differential case for containing the differential device therein are formed separately from each other and the cylinder block is formed with a long skirt portion in order to define a crank chamber in a lower section thereof and for supporting the transmission shaft. This causes the cylinder block itself to be of a very large size. It is generally required, however, that the cylinder block have a higher rigidity and higher dimensional accuracy and therefore be formed of a more expensive material than the oil pan or the differential case because of its engine functions. Accordingly, if the cylinder block is of larger size than conventional ones for the mentioned and any other reasons, the cylinder block rigidity is reduced and the production cost is higher. The other prior art arrangements have various other related problems.

The present invention has been accomplished in view of the above-mentioned circumstances and an object is to provide a simply constructed drive system for a vehicle wherein the problems are solved by permitting the cylinder block of the engine to be formed considerably more compact than prior arrangements.

In order to solve the problems mentioned above, according to the alternate preferred embodiments of the invention, the drive system for the vehicle is provided with a power plant which includes an engine, a transmission and a differential device, the power plant being located longitudinally of the vehicle with a crankshaft of said engine being directed toward the front and rear of the vehicle, the power plant driving left and right drive wheels disposed on opposite sides of the plant, wherein the engine has a cylinder axis inclined in either the left or right direction of the vehicle and includes a cylinder block and an oil pan means, the cylinder block and the oil pan means being joined together at surfaces thereof on a plane which extends through the center of the journal bearings for the crankshaft as well across the cylinder axis at right angles, and wherein the differential device is contained within a differential case which is connected to a lower side face of the engine on the side of inclination of the engine, and an intermediate transmission shaft penetrates through and is carried by oil pan means for operatively connecting the differential device and the drive wheel which is located on the opposite side of the engine as the differential device. In one embodiment, the oil pan means is comprised of a lower case connected to the cylinder block and an oil pan connected to the lower case whereas in the other embodiment the oil pan means is of a one-piece construction.

In the operation of the engine of this invention, its output is transmitted to the differential device through a clutch, a transmission and a propeller shaft and further from the differential device to a drive wheel on the opposite side of the engine as the differential device through the intermediate transmission shaft, a universal joint, a drive shaft and another universal joint. The output is also transmitted from the differential device through a universal joint, a drive shaft and further universal joint to a drive wheel on the same side of the engine as the differential device.

The plane of the lower joining surface of the cylinder block of the engine extends across the cylinder axis at right angles and passes through the center of the journal bearing for the crankshaft whereby the skirt portion of the cylinder block is short and does not support the intermediate transmission shaft, thereby leading to a compactness of the cylinder block as well as a simplified structure and configuration thereof.

The invention will now be described in connection with two preferred embodiments as shown in the drawings, wherein.

Figure 1:
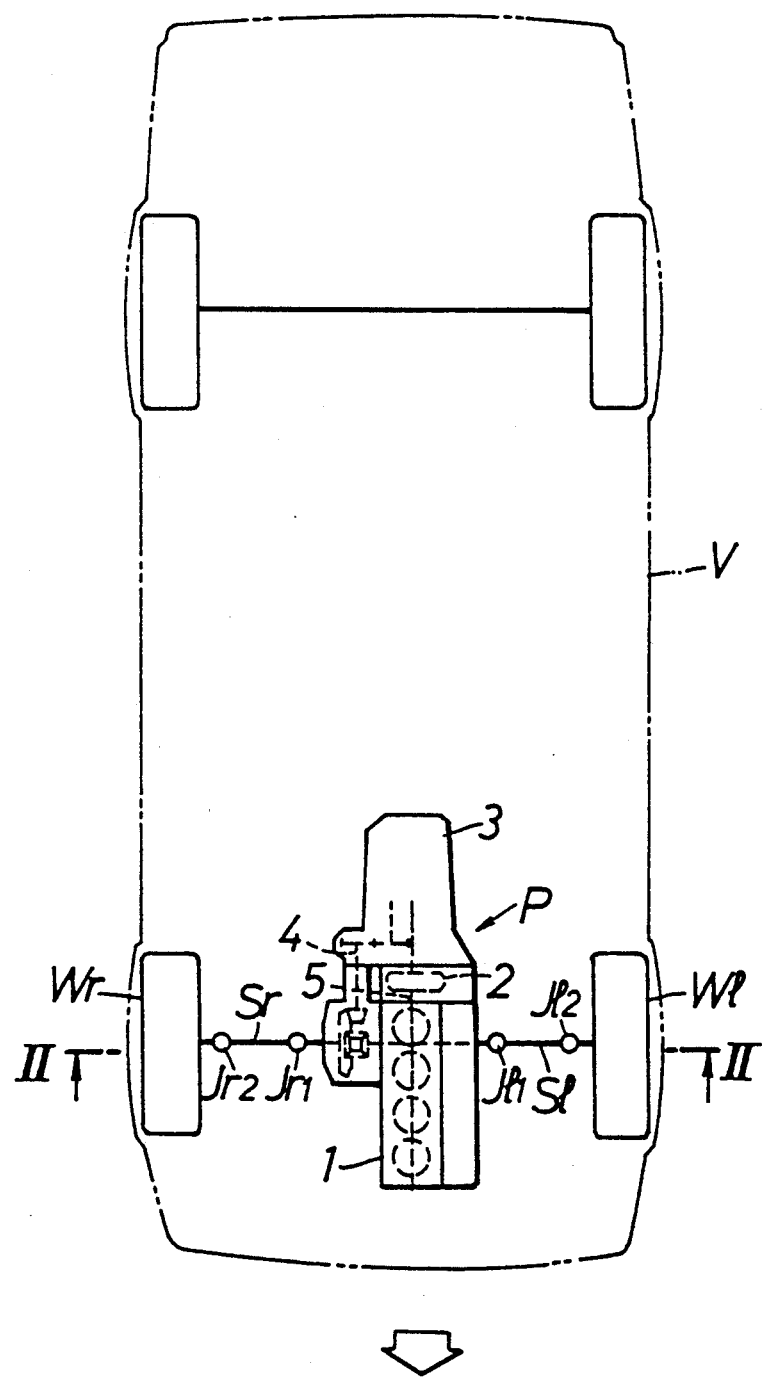
FIG. 1 is a schematic plan view of a vehicle on which a system according to the first embodiment of the invention is mounted.

Referring now to FIG. 1, a power plant P which is comprised of an engine 1, a clutch 2, a transmission 3 and a differential device D as a unit is mounted on a vehicle V in the longitudinal direction thereof (with a crankshaft 5 of the engine 1 being directed parallel to the longitudinal axis of the vehicle V) and the output of the power plant is transmitted through joints $Jl_1$, $Jr_1$, drive shafts Sl, Sr, and joints $J_2$, $Jr_2$, to front wheels Wl, Wr as left and right drive wheels, respectively.

Figure 2:
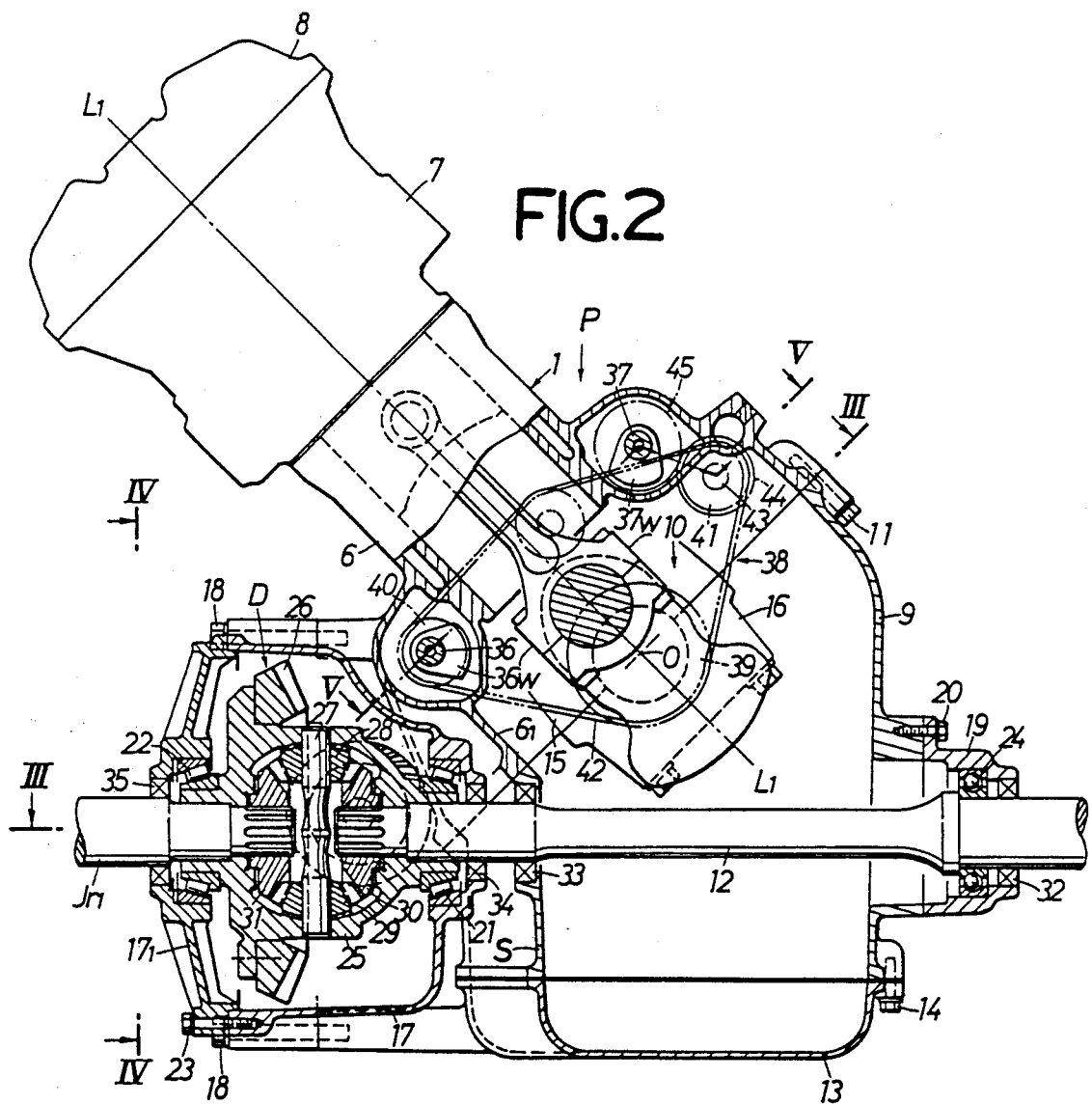
FIG. 2 is an enlarged sectional elevation view taken along a line II—II in FIG. 1.
Figure 3:
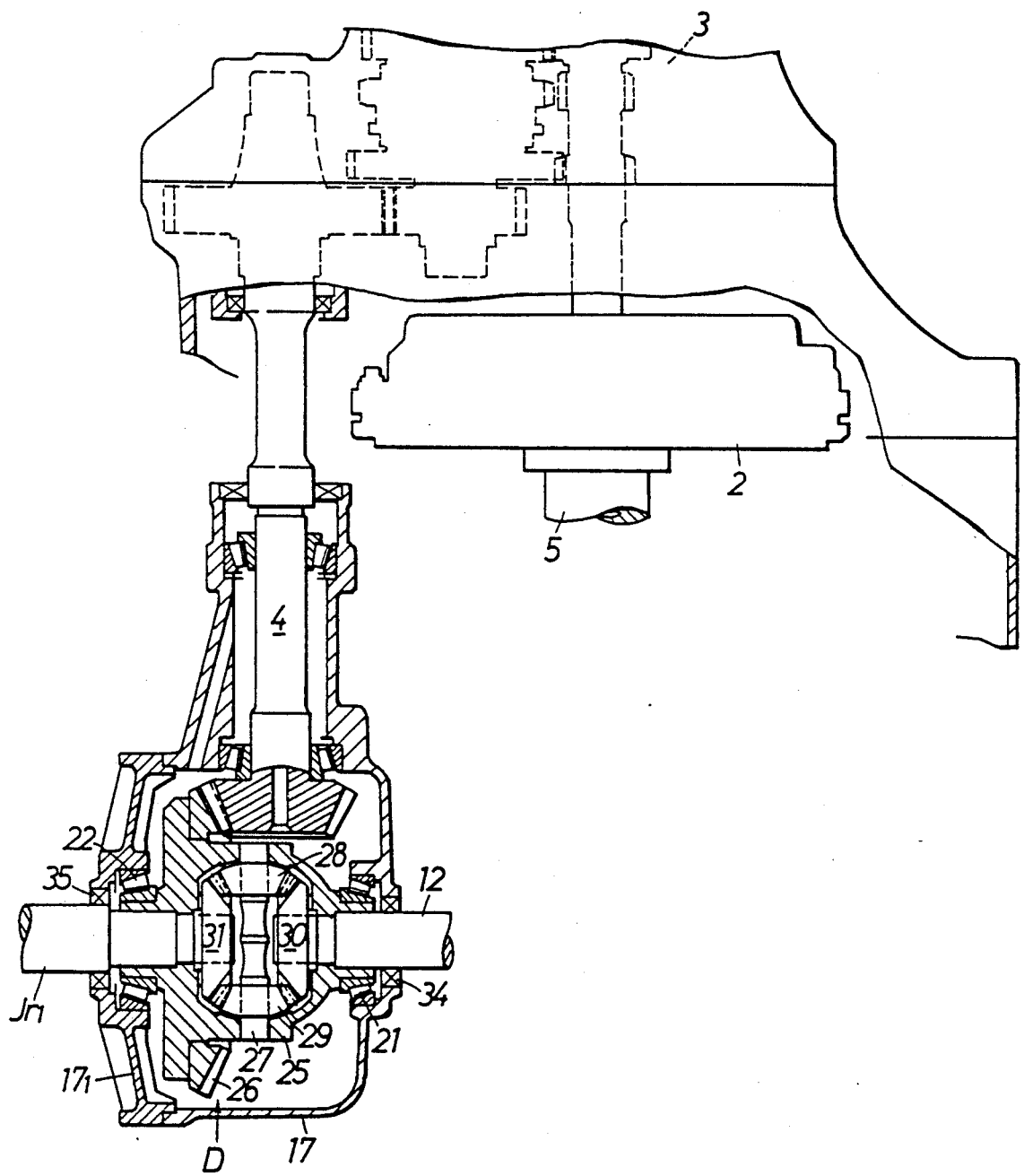
FIG. 3 is an enlarged sectional plan view taken along a line III—III in FIG. 2.
Figure 4:
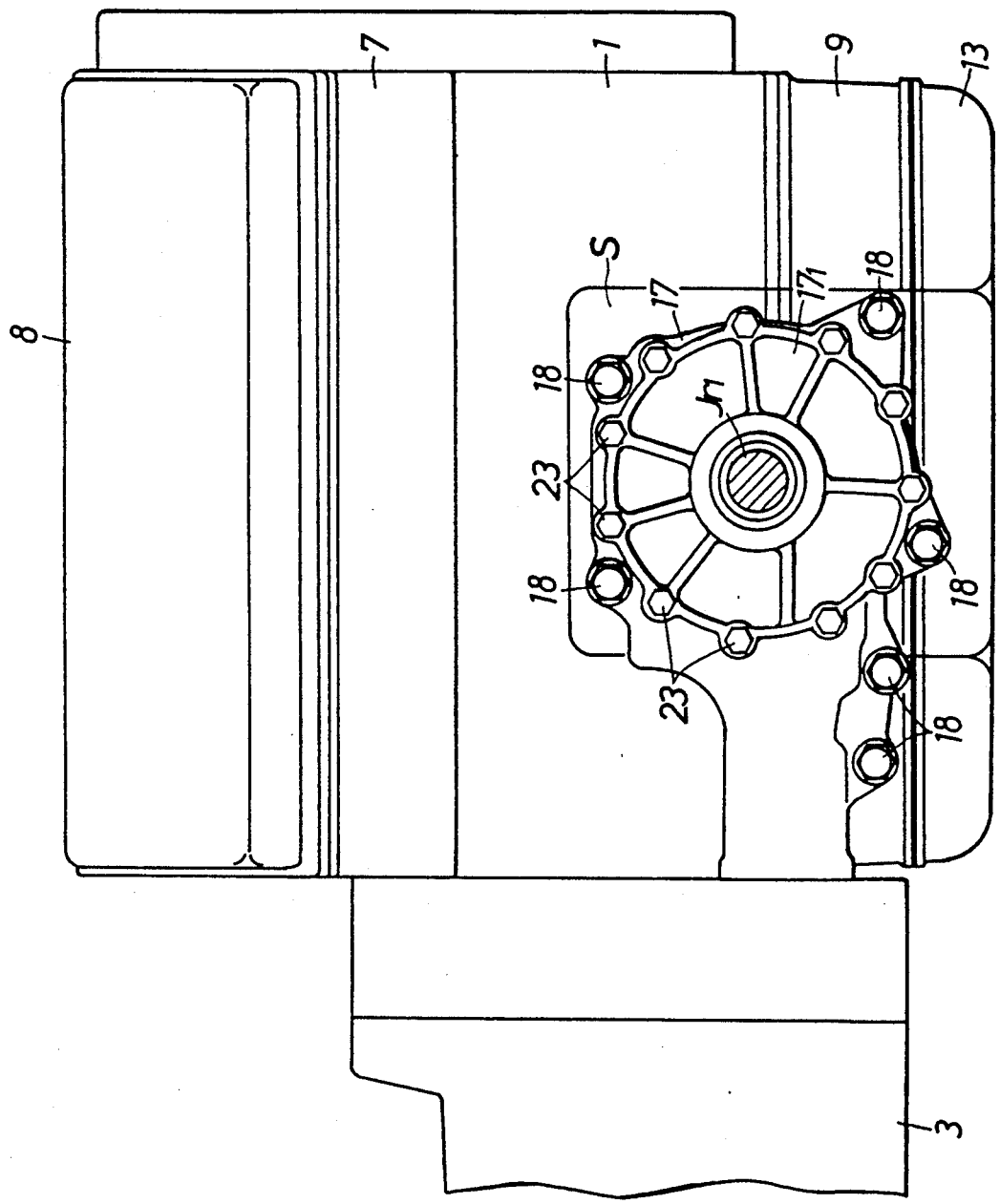
FIG. 4 is a side view taken in the direction of a line IV—IV in FIG. 2.

As shown in FIGS. 2 and 3, the engine 1 of the power plant P has a cylinder axis $L_1$—$L_1$ set at an inclination (about 45°) in one of the left or right directions of the vehicle V with respect to the vertical line (to the right side in the travelling direction of the vehicle V in this illustration) and a cylinder head 7 with a head cover 8 atop the head 7 are superposed and connected onto an upper surface of the cylinder block 6. The cylinder block 6 includes a crankcase portion $6_1$ constituting an upper half of a crankcase area which is joined at its lower surface with a lower case 9, constituting a lower half of the crankcase area, by a plurality of connection bolts 11. The joining surfaces of these halves are on an inclined plane extending across the cylinder axis $L_1-L_1$ at right angles and passing through the center O of the journal bearings 10 for supporting the journal shaft portion of the crankshaft 5. The lower case 9 is formed to have a high enough rigidity to constitute the lower half of the crankcase area and to support an intermediate transmission shaft 12 to be described later. An oil pan 13 is connected to a lower open surface of the lower case 9 by connection bolts 14. The journal bearings 10 are comprised of a bearing half 15 formed within the crankcase portion $6_1$ of the cylinder block 6 and a bearing cap 16 coupled to the bearing half 15, and each journal shaft portion of the crankshaft 5 is rotatably carried by one of these journal bearings 10.

On the side of inclination of the cylinder block 6 of the engine 1, a differential case 17 with the differential device D contained therein is arranged adjacent to that side of the cylinder block 6 and this differential case 17 is connected to the crankcase part $6_1$ of the cylinder block 6 and the oil pan 13 in a manner bridging lower case S by a plurality of bolts 18. To the open end surface of the differential case 17 is attached a cover member $17_1$ by a plurality of bolts 23. As an alternative arrangement, the differential case 17 may be bridged over and connected to the crankcase part $6_1$ and the lower case 9. The sides of the lower case 9 and oil pan 13 are depressed inwardly at S to accommodate the differential case 17.

The aforementioned intermediate transmission shaft 12 extends substantially horizontally through the lower case 9 in perpendicular relationship to the crankshaft 5 and the shaft 12 is rotatably supported at one end portion thereof (the right end portion in FIG. 2) on the lower case 9 by a bearing holder 19. More specifically, the bearing holder 19 is connected to an outside wall of the lower case 9 by a plurality of bolts 20 and the end portion of the intermediate transmission shaft 12 is carried for rotation in the bearing holder 19 by a ball bearing 24. The other end portion of the intermediate transmission shaft 12 extends through mutually adjacent side walls of the lower case 9 and the differential case 17 and is rotatably carried in the differential case 17 by a tapered roller bearing 21. That end of the intermediate transmission shaft 12 which projects into the differential case 17 is spline-connected to a pinion drive gear 30 of the differential device D.

As has been described above, the differential device D is positioned in a dead space located below the inclined cylinder block 6, thus permitting the whole power plant P to be very compact. The differential device D is constructed in a conventionally known manner and comprises a differential housing 25 rotatably supported on the differential case 17 by means of tapered roller bearings 21, 22, a driven gear 26 of a large diameter fixed to the outer periphery of the differential housing 25 and operatively engages a bevel gear on the propeller shaft 4 which extends from the transmission 3, a pair of differential pinion gears 28, 29 carried by a pin 27 on the differential housing 25, and a pair of pinion drive gears 30, 31 meshed with the differential pinion gears 28, 29. One pinion drive gear 30 is spline-connected to the inner end of the intermediate transmission shaft 12 and the other pinion drive gear 31 is spline-connected to the universal joint $Jr_1$. The inner end of the universal joint $Jr_1$ is rotatably supported on the outer wall of the differential case 17 via the tapered roller bearing 22 and the universal joint $Jr_1$ is in turn coupled at the outer end thereof to the right-hand drive wheel Wr through the drive shaft Sr and the other universal joint $Jr_2$, as shown in FIG. 1. The other end of the intermediate transmission shaft 12 is spline-connected with the inside end of the universal joint $Jl_1$ and the outside end of the universal joint $Jl_1$ is coupled to the left-hand drive wheel Wl through the drive shaft Sl and the further universal joint $Jl_2$ as shown in FIG. 1. The reference numerals 32, 33, 34 and 35 designate oil seals in the drawings.

When the engine 1 of the power plant P is operated, its output is transmitted from the clutch 2 and the transmission 3 through the propeller shaft 4 to the differential device D and then from the device D to the left-hand drive wheel Wl through the intermediate transmission shaft 12, universal joint $Jl_1$, drive shaft Sl and further universal joint $Jl_2$ and also to the right-side drive wheel Wr through the universal joint $Jr_1$, drive shaft Sr and further universal joint $Jr_2$.

By this arrangement of the present invention, the lower surface of the cylinder block 6 of the engine 1 is on a plane that extends across the cylinder axis $L_1-L_1$ at right angles and passes through the center O of the journal bearings 10, whereby the cylinder block 6 is compact as a whole due to the short skirt portion and it need not support the intermediate transmission shaft 12 which is adequately supported with ease by the differential case 17 and lower case 9. As a result, the rigidity and accuracy of the cylinder block 6 can be enhanced thereby contributing to an improvement in performances of the engine 1 itself.

Figure 5:
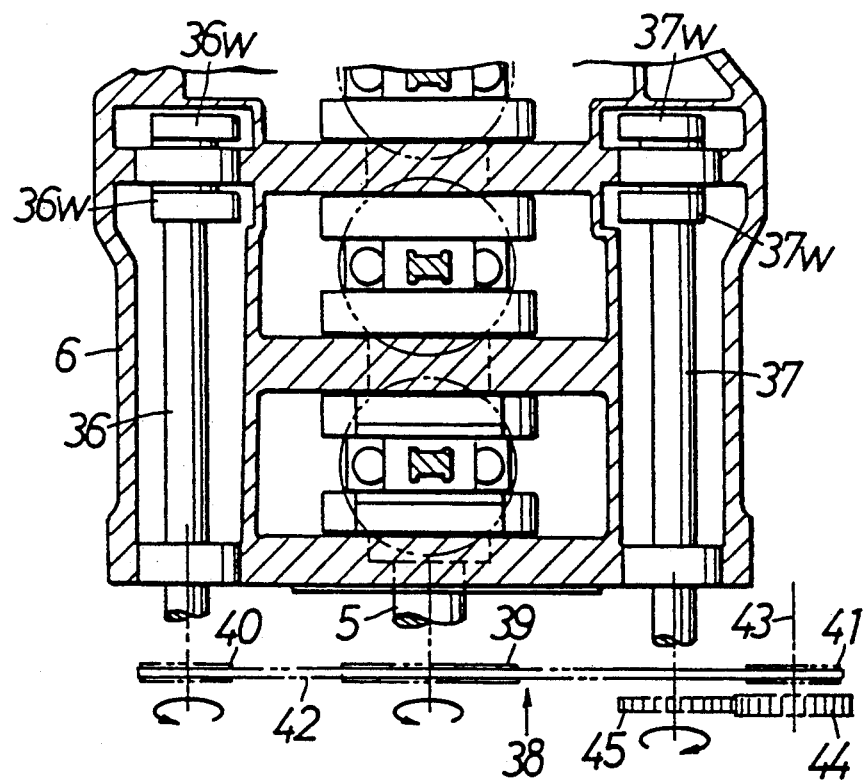
FIG. 5 is a sectional plan view, with a portion as a schematic view of a drive line for the balancer shafts, taken along a line V—V in FIG. 2.

As shown in FIGS. 2 and 5, a pair of balancer shafts 36, 37 are carried within the crankcase 7 of the cylinder block 6 on opposite sides of the crankshaft 5 parallel to the latter and each of these balancer shafts 36, 37 is provided with a pair of weights 36W, 36W and 37W, 37W, respectively. The pair of balancer shafts 36 and 37 are operatively connected to the crankshaft 5 via a timing transmission device 38.

The timing transmission device 38 comprises a drive pulley 39 fixed to the crankshaft 5, a first driven pulley 40 fixed to one balancer shaft 36, a second driven pulley 41 rotatably supported on the crankcase part $6_1$ of the cylinder block 6 adjacent and parallel to the other balancer shaft 37, an endless timing belt 42 wound around the drive and driven pulleys 39 and 40, 41, a drive gear 44 fixed to an intermediate shaft 43 on which the second driven pulley 41 is mounted and a driven gear 45 fixed to the other balancer shaft 37 and in mesh with the drive gear 44. In this device, the number of teeth on each of the first and second driven pulleys 40 and 41 is equal to one half the number of teeth of the drive pulley 39 whereas the gears 44 and 45 each have the same number of teeth. Thus, the balancer shafts 36 and 37 are rotated in opposite directions at twice the speed of rotation of the crankshaft 5 during rotation of the latter and the sum of the centrifugal forces obtained by the weights 36W and 37W serves to negate the secondary force of inertia of the reciprocating mass of the engine 1.

Figure 6:
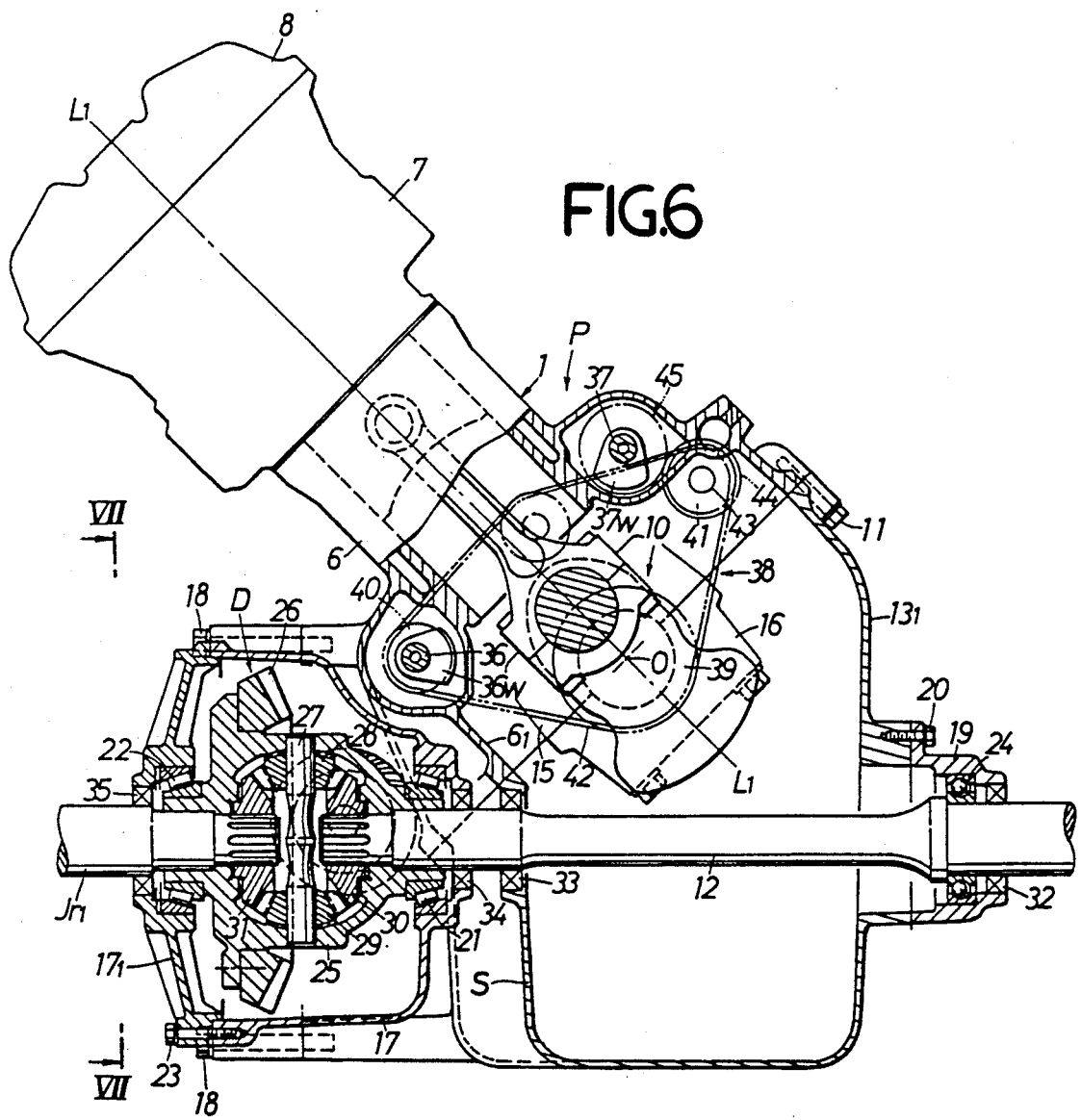
FIG. 6 is a sectional view similar to FIG. 2 illustrating a second embodiment of the invention.
Figure 7:
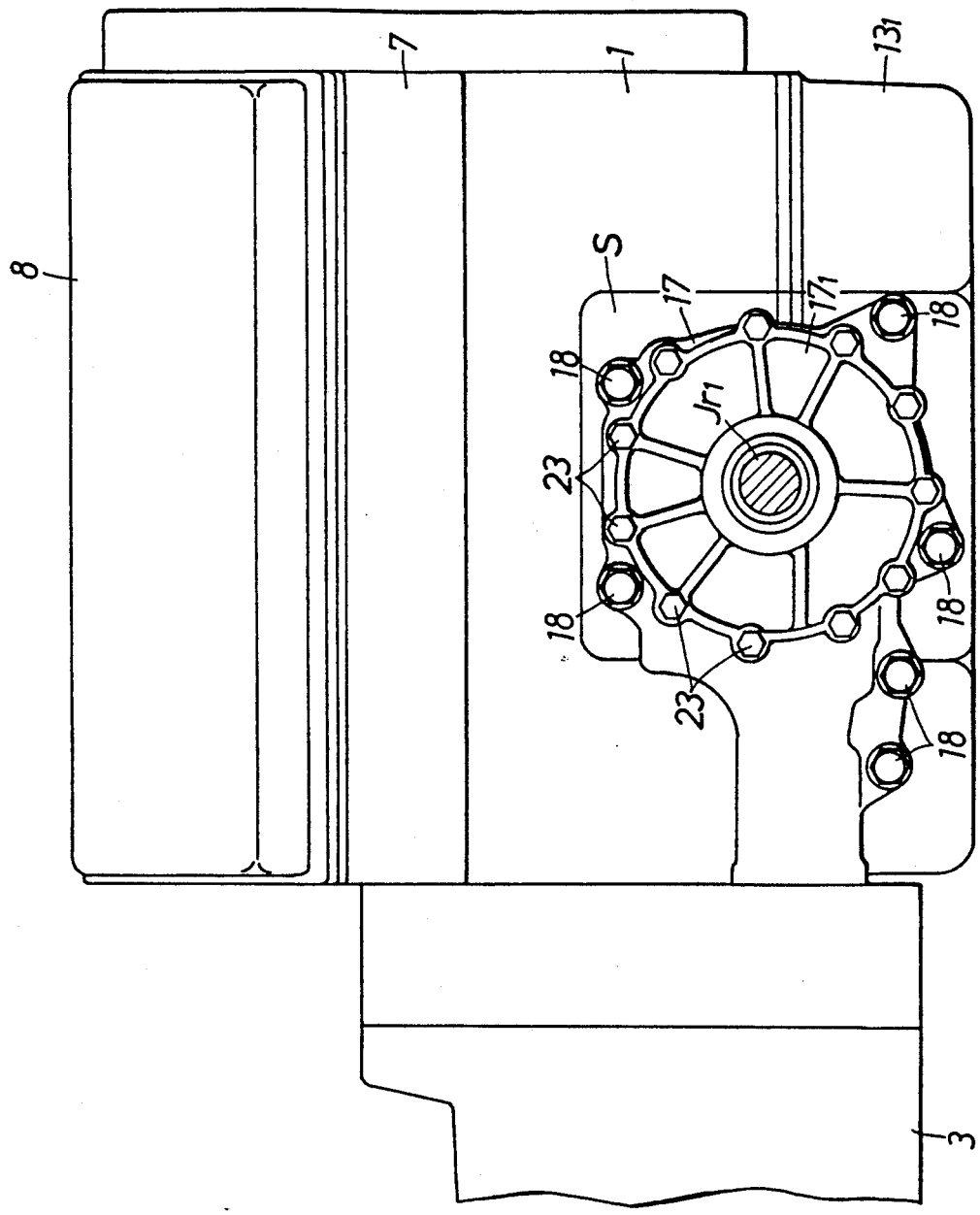
FIG. 7 is a side view taken in the direction of line VII—VII in FIG. 6.

FIGS. 6 and 7 show a second embodiment according to the present invention. In this second embodiment, an oil pan $13_1$ is directly coupled to the inclined lower surface of the crankcase portion $6_1$ of the cylinder block 6 and the lower case 9 of the first embodiment has been omitted. The intermediate transmission shaft 12 penetrates through the oil pan $13_1$ and has one end carried on the oil pan $13_1$ rotatably via the bearing holder 19 in the same manner. The differential case 17 is bridged between and carried by the crankcase portion $6_1$ of the cylinder block 6 and the oil pan $13_1$.

This second embodiment enjoys the same advantages as the first embodiment described above and moreover is advantageous in reducing the number of components because a lower case 9 is not required.

As has been described above, according to the invention, the skirt portion of the cylinder block has a greatly reduced length and need not support the intermediate transmission shaft thereon so that it can be very compact thereby to assure its high rigidity and high degree of accuracy very easily as well as to achieve a remarkable cost reduction. According to the second embodiment of the invention, it is further advantageous to reduce the number of parts over those of the first embodiment.

What is claimed is:

1. A drive system for a vehicle provided with an engine, a transmission and a differential device with the engine oriented with its crankshaft extending longitudinally of the vehicle for driving left and right wheels disposed on opposite sides of the engine, wherein said engine has a cylinder block with a cylinder axis inclined in one of either the left or right direction of the vehicle, an oil pan means being joined in the cylinder block at joining surfaces thereof on a plane perpendicular to said cylinder axis, and wherein said differential device is contained within a differential case which is connected to a lower side face of said engine on the side of inclination of the engine, and a power transmission shaft extending through both of opposite side portions of said oil pan means for operatively connecting said differential device and one said drive wheel located on the opposite side of the engine as the differential device, said differential case being connected to and supported by said cylinder block and said oil pan means.

2. The drive system according to claim 1, wherein said plane of the joining surfaces extends through substantially the center of journal bearings supporting the crankshaft.

3. The drive system according to claim 1, wherein one end of said power transmission shaft is supported by said oil pan means and the other end of said power transmission shaft is supported by said differential case.

4. The drive system according to claim 3, wherein a bearing means is provided in said oil pan means and another bearing is provided in said differential case for providing said support of the one end and other end of the power transmission shaft.

5. The drive system according to claim 4, wherein said bearing means in said oil pan means includes a removable bearing holder mounted on a housing portion of the oil pan means.

6. The drive system according to claim 1, wherein said differential case is spaced from both said cylinder block and said oil pan means except at connections thereof to the cylinder block and oil pan means.

7. The drive system of claims 1, 2, 3, 4, 5, or 6 wherein said oil pan means is comprised of an open case mounted directly to the cylinder block at said joining surfaces, and an oil pan mounted on said case below said power transmission shaft.

8. The drive system of claims 1, 2, 3, 4, 5, or 6 wherein said oil pan means includes an integral closed case having one of said joining surfaces for mounting directly to the cylinder block and a closed bottom for containing engine oil.

* * * * *